(12) United States Patent
Morris

(10) Patent No.: US 8,151,825 B2
(45) Date of Patent: Apr. 10, 2012

(54) REVERSE FLOW WYE CONNECTOR

(75) Inventor: Bruce E. Morris, Houston, TX (US)

(73) Assignee: Quality Connector Systems, Houston, TX (US)

( * ) Notice: Subject to any disclaimer, the term of this patent is extended or adjusted under 35 U.S.C. 154(b) by 176 days.

(21) Appl. No.: 12/769,385

(22) Filed: Apr. 28, 2010

(65) Prior Publication Data

US 2010/0301597 A1 Dec. 2, 2010

Related U.S. Application Data

(62) Division of application No. 11/796,122, filed on Apr. 26, 2007, now Pat. No. 7,891,377.

(51) Int. Cl.
*F16K 11/085* (2006.01)

(52) U.S. Cl. .................. 137/874; 137/625.46; 251/352

(58) Field of Classification Search ............. 137/625.46, 137/625.47, 874, 876; 251/352; 15/104.062
See application file for complete search history.

(56) References Cited

U.S. PATENT DOCUMENTS

| 797,547 | A | 8/1905 | Bachelder |
|---|---|---|---|
| 1,753,989 | A | 4/1930 | Wilhelm |
| 1,767,658 | A | 6/1930 | Fantz |
| 2,587,934 | A | 3/1952 | Volpin |
| 3,139,932 | A | 7/1964 | Johnson |
| 3,186,014 | A | 6/1965 | Herbert |
| 3,545,489 | A | 12/1970 | Brown et al. |
| 3,664,376 | A | 5/1972 | Watkins |
| 3,674,123 | A | 7/1972 | Lewis et al. |
| 3,955,793 | A | 5/1976 | Burkhardt et al. |
| 4,224,986 | A | 9/1980 | Rothberg |
| 4,230,299 | A | 10/1980 | Pierce, Jr. |
| 4,291,724 | A | 9/1981 | Miller |
| 4,372,337 | A | 2/1983 | Holzenberger |
| 4,411,459 | A | 10/1983 | Ver Nooy |
| 4,650,151 | A | 3/1987 | McIntyre |
| H252 | H | 4/1987 | Sturman |
| 4,821,772 | A | 4/1989 | Anderson et al. |
| 4,865,078 | A | 9/1989 | Ensign |
| 4,964,612 | A | 10/1990 | Maggioni et al. |
| 4,971,307 | A | 11/1990 | Killerud et al. |
| 5,076,308 | A | 12/1991 | Cohen |
| 5,076,319 | A | 12/1991 | Salley |
| 5,215,112 | A | 6/1993 | Davison |
| 5,307,838 | A | 5/1994 | d'Agostino et al. |
| 5,490,660 | A | 2/1996 | Kamezawa |
| 5,842,816 | A | 12/1998 | Cunningham |
| 5,857,715 | A | 1/1999 | Gray et al. |
| 5,893,392 | A | 4/1999 | Spies et al. |
| 6,142,708 | A | 11/2000 | Tarlton et al. |

(Continued)

OTHER PUBLICATIONS

U.S. Patent and Trademark Office, "Office Communication," for U.S. Appl. No. 11/796,122 mailed May 11, 2010.

(Continued)

*Primary Examiner* — John Fox
(74) *Attorney, Agent, or Firm* — Meyertons, Hood, Kivlin, Kowert & Goetzel, P.C.; Eric B. Meyertons

(57) ABSTRACT

A subsea fitting is disclosed. The subsea fitting includes a body. The fitting includes at least two passages through the body. The passages are in fluid communication within the body. A diverter is located in at least one of the passages. The diverter may be movable between an open position and a closed position. In the open position, the diverter allows open flow between two of the passages. In the closed position, the diverter inhibits flow between the two passages.

20 Claims, 5 Drawing Sheets

U.S. PATENT DOCUMENTS

| | | |
|---|---|---|
| 6,260,819 B1 | 7/2001 | Ovsepyan |
| 6,276,662 B1 | 8/2001 | Bugatti |
| 6,283,152 B1 | 9/2001 | Corte |
| 6,290,207 B1 | 9/2001 | Genga |
| 6,311,727 B1 | 11/2001 | Campau |
| 6,340,148 B1 | 1/2002 | Sung |
| 6,851,478 B2 | 2/2005 | Cornelssen et al. |
| 6,935,615 B2 | 8/2005 | McCarty |
| 7,891,377 B2 | 2/2011 | Morris et al. |
| 2003/0020034 A1 | 1/2003 | Newport et al. |
| 2004/0149951 A1 | 8/2004 | Gethmann |
| 2008/0263796 A1 | 10/2008 | Morris et al. |
| 2009/0224189 A1 | 9/2009 | Morris et al. |

OTHER PUBLICATIONS

U.S Patent and Trademark Office, "Office Communications" for U.S. Appl. No. 11/857,972, mailed Jan. 7, 2011 and May 11, 2011.

BKW Inc. Pig Switches web product page (www.bkwinc.com/pigging.html), date unknown; 3 pages.

Oll States Hydrotech Piggable Y Fittings web product page (www.oilstateshydrotech.com), date unkown; 1 page.

"All About Pigging" from Pipeline Design for Pigging article, date unknown; 1 page.

U.S. Patent and Trademark Office, "Office Communications" U.S. Appl. No. 12/044,705 mailed May 18, 2011 and Sep. 23, 2011.

REVERSE FLOW WYE CONNECTOR

PRIORITY CLAIM

This patent application is a divisional of U.S. patent application Ser. No. 11/796,122 entitled "REVERSE FLOW WYE CONNECTOR" to Morris filed on Apr. 26, 2007.

BACKGROUND

1. Field of the Invention

The present invention relates to subsea pipelines and connectors and/or fittings used in the pipelines. Some embodiments relate to fittings to combine and/or redirect flow in the pipelines. More particularly, the invention relates to a subsea fitting used to facilitate pigging and/or cleaning of subsea pipelines.

2. Description of Related Art

Offshore pipeline systems are a maze of connected and interconnected pipeline segments that transport hydrocarbons or related products from one point to another. The pipeline connection points initiate at the wellhead and connect to subsea manifolds, offshore structures, and, eventually, to land for final processing and distribution of the products. Due to the expenses of running dedicated pipelines from the initiating point direct to processing stations, shorter pipeline segments are joined to existing or larger pipelines to create the product pipeline from the source (e.g., the initiating wellhead) to the market (e.g., onshore stations).

Pipeline interconnects have been accommodated by placing tee-shaped fittings with a perpendicular intersect into a pipeline to create what has been known as a branch or lateral connection point. These connections provide a means of combining the product from one line with another. However, these connections do not allow for the passage of certain pigs used for cleaning and inspection, sometimes referred to as solid-mandrel, trained, or intelligent pigs. Combining the flow of two pipelines into one line to allow for pigging by all common forms of pigs requires the use of a fitting known as a piggable wye.

Piggable wye fittings have relatively shallow intersect angles, typically about 30° or less, which allow for fairly smooth transmission of long pigs and pig trains from either of the two inlet bores through the intersect and out through a common exhaust. However, if a pig is ever run into the piggable wye in a reverse direction, the pig will jam in the intersect of the wye, abnormally shutting down the pipeline.

Reverse flow of a pipeline is becoming increasingly more common. To this end, the ability to pig in the reverse flow direction is becoming a more common consideration for pipeline design. Thus, a piggable wye fitting that can be configured to suitably pass all forms of pigs in normal (e.g., combining) flow conditions and in reverse (e.g., directed) flow conditions is desirable.

SUMMARY

In certain embodiments, a subsea fitting includes a body with at least two passages through the body. The passages are in fluid communication within the body. A diverter may be located in at least one of the passages. The diverter may be movable between an open position and a closed position. In the open position, the diverter allows open flow between two of the passages. In the closed position, the diverter allows the passage of a pig in a specific passage in both directions.

In some embodiments, the two passages are oriented relative to each other such that at least one of the passages is piggable in the reverse direction. The two passages may be oriented with about a 30° angle between the passages. The two passages may be oriented symmetrically about a central axis.

In some embodiments, the diverter is coupled to the body using a flange. The diverter may include a tubular that fits snugly inside the passage, or have a non-interference fit with a gap between the diverter and the body, and is allowed to rotate inside the passage. The tubular may have an opening. In the open position, the opening allows open flow between the two passages. In the closed position, the opening is positioned so that open flow is inhibited between the two passages.

In some embodiment, the diverter includes orifices that allow at least some fluid flow between the two passages to equalize pressure between the two passages. The orifices inhibit object flow between the two passages.

In some embodiments, a drive hub moves the diverter between the open and closed positions. The drive hub may include teeth, or castellations, that engage mating teeth, or castellations, on the diverter so that the drive hub is able to move the diverter. A gear may be coupled to the drive hub. The gear may move the drive hub. The gear may include teeth that engage teeth on the drive hub so that the gear operates the drive hub. The coupling between the gear and the drive hub may be substantially sealed from external pressure. The gear may be operable using a remotely operated vehicle (ROV) or other tool. A torque bucket or other operator may be coupled to the gear.

BRIEF DESCRIPTION OF THE DRAWINGS

Features and advantages of the methods and apparatus of the present invention will be more fully appreciated by reference to the following detailed description of presently preferred but nonetheless illustrative embodiments in accordance with the present invention when taken in conjunction with the accompanying drawings in which.

Figure 1:
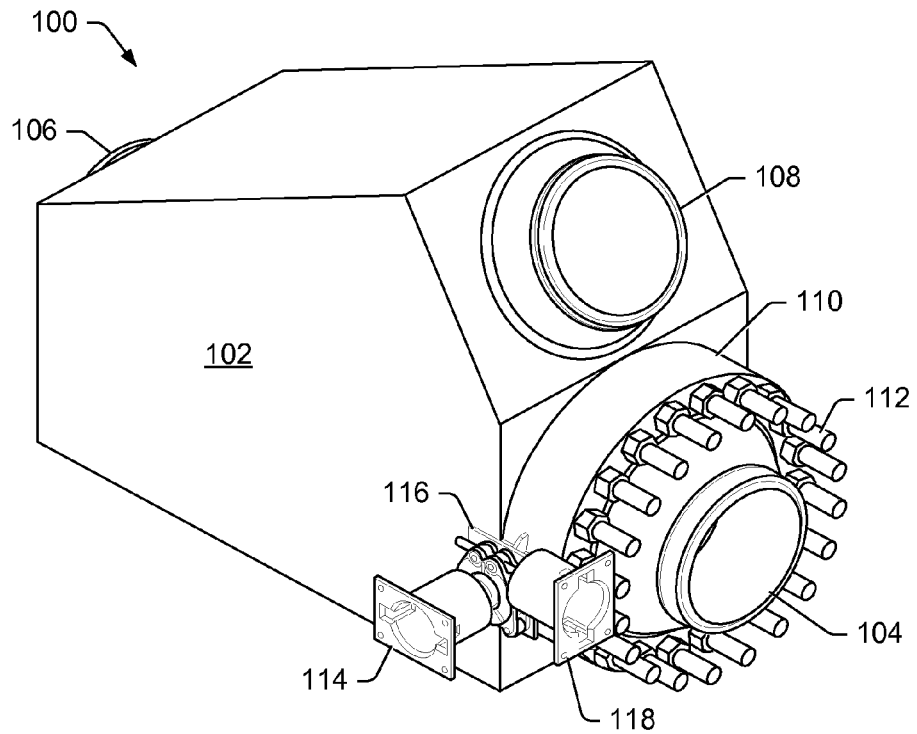
FIG. 1 depicts a perspective representation of an embodiment of a subsea fitting.

While the invention is susceptible to various modifications and alternative forms, specific embodiments thereof are shown by way of example in the drawings and will herein be described in detail. The drawings may not be to scale. It should be understood that the drawings and detailed description thereto are not intended to limit the invention to the particular form disclosed, but to the contrary, the intention is to cover all modifications, equivalents and alternatives falling within the spirit and scope of the present invention as defined by the appended claims.

DETAILED DESCRIPTION OF EMBODIMENTS

In the context of this patent, the term "fitting" means a fitting or connector that may be coupled into a pipeline (e.g., a subsea pipeline). The term "coupled" means either a direct connection or an indirect connection (e.g., one or more intervening connections) between one or more objects or components. The phrase "directly connected" means a direct connection between objects or components such that the objects or components are connected directly to each other so that the objects or components operate in a "point of use" manner. The term "open flow" means that flow is open to both fluid and objects through a passage.

Figure 2:
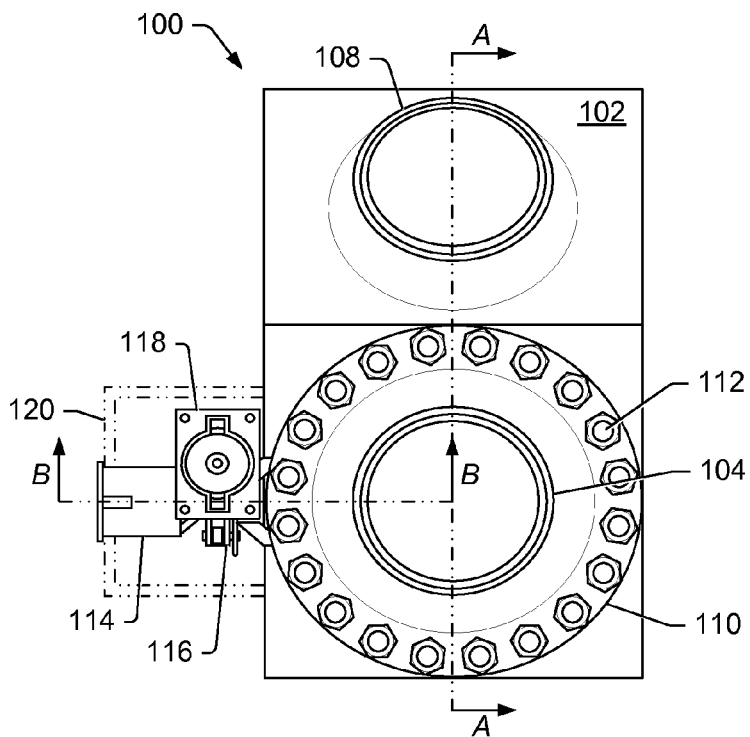
FIG. 2 depicts an end view of the subsea fitting depicted in FIG. 1.

FIG. 1 depicts a perspective representation of an embodiment of subsea fitting 100. FIG. 2 depicts an end view of fitting 100. Fitting 100 includes body 102. Body 102 may be made from materials such as, but not limited to, carbon steel, stainless steel, titanium, or aluminum. In some embodiments, body 102 is a single piece forged or cast from any of the above listed materials as well as other materials. In some embodiments, body 102 is constructed by welding fabrication of plates, tubes, and forged or cast parts. Fitting 100 and body 102 may be operable in high pressure conditions due to the pipeline's pressurized contained product or ambient pressure from deep subsea conditions. For example, fitting 100 and body 102 may be configured to meet selected ASME (American Society of Mechanical Engineers) standards, ANSI (American National Standards Institute) ratings, and/or ASTM (American Society for Testing and Materials) standards. In some embodiments, body 102 is coated with a material to increase the strength, weldability, and/or corrosion resistance of the body. For example, body 102 may be coated with an epoxy such as Carboline 890® epoxy (Carboline Company, St. Louis, Mo., USA).

In certain embodiments, fitting 100 is a wye-shaped fitting. Fitting 100 includes three ports 104, 106, and 108 on body 102. Ports 104, 106, and 108 may be at the ends of one or more passages in body 102 (e.g., the ports define the ends of the passages). Flanges may be coupled to one or more of the ports. In certain embodiments, flange 110 is coupled to port 104. Flange 110 may be coupled to port 104 using bolts 112, or other means such as welding or threaded engagement, that attach flange 110 to body 102 at port 104. In certain embodiments, ports 104, 106, and/or 108 allow fitting 100 to be coupled to one or more subsea pipelines and/or additional fittings. In some embodiments, ports 104, 106, and/or 108 are coupled to one or more subsea pipelines and/or additional fittings using methods known in the art (e.g., welding). For example, pipe or connector flanges may be welded to ports 104, 106, and/or 108 on fitting 100. In some embodiments, flange 110 and/or other flanges allow fitting 100 to be coupled to one or more subsea pipelines and/or additional fittings at ports 104, 106, and/or 108.

In certain embodiments, bucket 114 is coupled to flange 110. Bucket 114 may be coupled to flange 110 using connector 116. In some embodiments, connector 116 is coupled to bucket 118. In some embodiments, as shown in FIG. 2, covering 120 may enclose at least a portion of bucket 114, connector 116, and/or bucket 118. Covering 120 may at least partially protect bucket 114, connector 116, and/or bucket 118. For example, covering 120 may protect bucket 114, connector 116, and/or bucket 118 from being accidentally hit by objects in and around fitting 100 (e.g., a robotic arm or other subsea tool).

Figure 3:
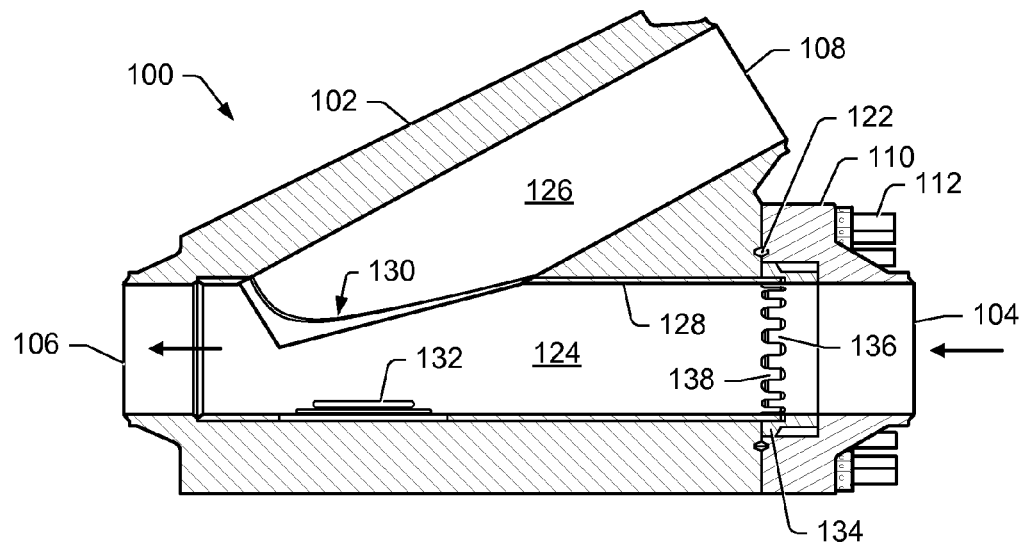
FIG. 3 depicts a cross-sectional representation of the fitting depicted in FIGS. 1 and 2 with a diverter in the fitting in an "open" position.
Figure 4:
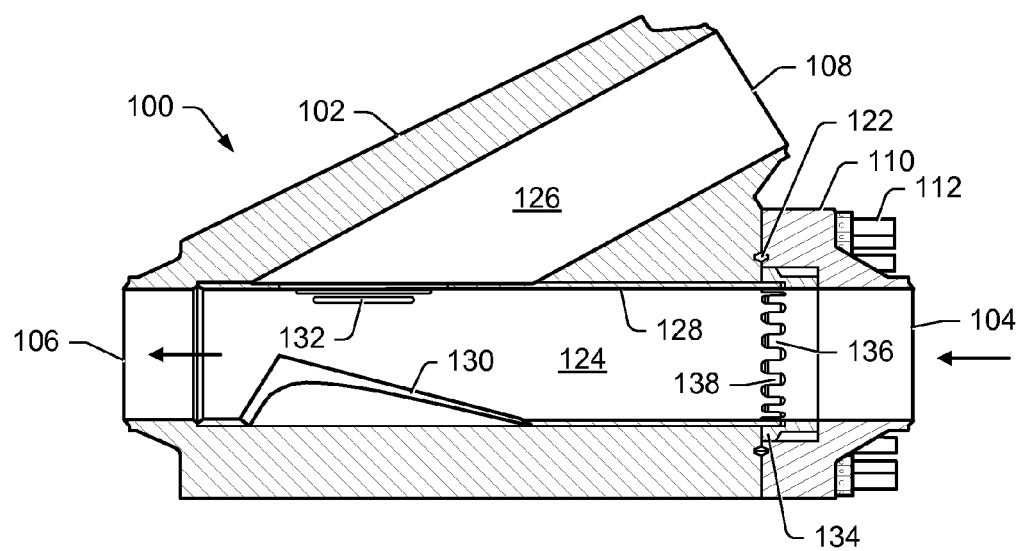
FIG. 4 depicts a cross-sectional representation of the fitting depicted in FIGS. 1 and 2 with the diverter in the fitting in a "closed" position.

FIGS. 3 and 4 depict cross-sectional representations of fitting 100 substantially along line A-A shown in FIG. 2. Passages 124 and 126 are in fluid communication with each other inside body 102. Passages 124 and 126 may be conduits through all or portions of body 102. In certain embodiments, passage 124 is a straight-through passage between port 104 and port 106. Passage 126 may branch off passage 124 to port 108 so that the passages are in a wye-shaped configuration. Passage 126 may branch off passage 124 at an angle that allows a pig to pass between the passages. In certain embodiments, passage 126 branches off passage 124 at an angle of about 30°. In some embodiments, passage 126 branches off passage 124 at an angle between about 0° and about 90°. In some embodiments, passage 126 branches off passage 124 at an angle in a range from about 10° to about 90°, in a range from about 20° to about 70°, or in a range from about 25° to about 60°.

Figure 9:
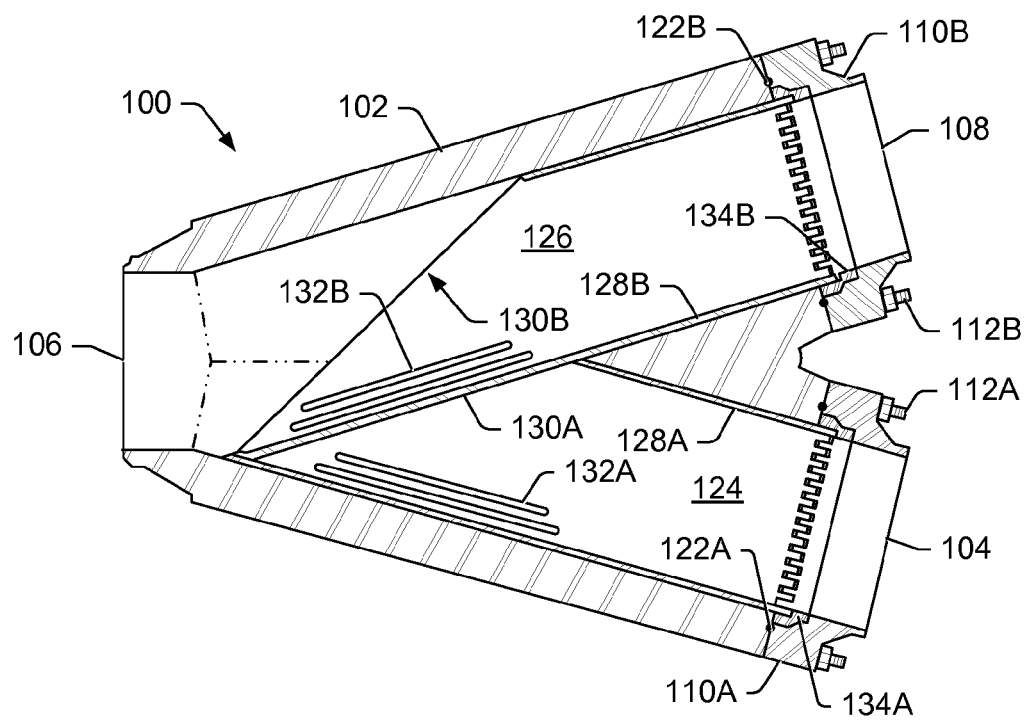
FIG. 9 depicts a cross-sectional representation of an embodiment of a subsea fitting with two diverters with one diverter in the closed position.

In some embodiments, passage 124 and/or passage 126 include one or more bends or other non-conformities as they pass through body 102. In some embodiments, passage 124 and passage 126 are symmetrical about a central axis (e.g., in a "Y"-shape about the central axis, as shown in FIG. 9). In certain embodiments, fitting 100 is designed so that fluid (e.g., oil) flow is through passage 124 from port 104 towards port 106 (in a right to left direction in FIGS. 3 and 4). Thus, a pig may enter fitting 100 through passage 126 via port 108 and be used to pig the pipeline in a reverse direction (e.g., a direction reverse to a combining flow direction in the pipeline). Pigging in the direction reverse of normal combining flow allows the pig to be launched into and retrieved from the pipeline at locations more convenient for the pipeline operator. Passage 126 and passage 124 are designed and oriented so that any standard pig (e.g., a cup or disc type pig) is usable with fitting 100.

As described above, flange 110 may be coupled to body 102 using bolts 112. In some embodiments, bolts 112 are threaded bolts attached to body 102 (e.g., the bolts are welded to the body, formed as part of the body, or threaded into threaded openings in the body). Nuts or other fasteners may be used to secure flange 110 to body 102 using bolts 112. In certain embodiments, seal 122 is provided between flange 110 and body 102. Seal 122 may be, for example, a gasket or o-ring that when pressed between the face of body 102 and the face of flange 110 creates a seal between the faces. Seal 122 inhibits fluid (e.g., seawater) from entering passage 124 between the faces of body 102 and flange 110 and inhibits fluid (e.g., pipeline fluid) from leaking out of passage 124 into the surrounding environment. In some embodiments, flange 110 is coupled to body 102 by welding the flange to the body. Welding the flange to the body allows the flange to be attached to the body without bolts and without a seal.

In certain embodiments, flange 110 includes and/or is coupled to diverter 128. Diverter 128 is a conduit (e.g., a sleeve or tubular) located inside passage 124 and/or passage 126. In certain embodiments, as shown in FIGS. 3 and 4, diverter 128 is within passage 124 and has a clearance between the diverter's outside face and the passage's inside face that allows the diverter to move (e.g., rotate) inside the passage (e.g., the diverter is a tubular that fits snugly inside the passage but is allowed to rotate inside the passage).

In certain embodiments, diverter 128 includes opening 130. Opening 130 is an opening sized to allow fluid and/or objects (e.g., pigs) to pass through diverter 128 between passage 124 and passage 126. In certain embodiments, opening 130 is an elliptical or scarf-shaped cut in diverter 128. The cut may substantially match the shape of the junction of passage 124 with passage 126 when opening 130 is aligned with the junction. In some embodiments, opening 130 has other shapes and/or sizes that match the size and/or shape of a junction between passages in fitting 100.

Diverter 128 may move (e.g., rotate) to move opening 130 in or out of position to allow fluid and/or objects to pass between passage 124 and passage 126. FIG. 3 depicts diverter 128 in an "open" position. In the open position, opening 130 is in a position that allows fluids and/or objects to pass between passage 124 and passage 126 (e.g., the passages are in fluid communication or there is "open flow" between the passages). FIG. 4 depicts diverter 128 in a "closed" position. In the closed position, opening 130 is in a position that inhibits fluids and/or objects from passing between passage 124 and passage 126.

In certain embodiments, diverter 128 includes one or more orifices 132. Orifices 132 may be small openings such as, but not limited to, slots, slits, holes, or other perforations. Orifices 132 may be located on an opposite side of diverter 128 from opening 130 (e.g., diametrically opposed to opening 130). In some embodiments, diverter 128 includes orifices 132 substantially over its entire surface to allow for fluid passage at all orientations of diverter 128. Orifices 132 are located on diverter 128 so that when the diverter is in the closed position, the orifices are positioned to allow at least some fluid to flow between passage 124 and passage 126. Allowing at least some fluid flow between the passages in the closed position may inhibit pressure differential buildup between the passages (e.g., substantially equalize the pressure between the passages). Allowing the flow between passages inhibits lateral thrust loads on diverter 128 that may be caused by differential pressures between the passages. Thrust loads may apply force to diverter 128 in its associated passage, which hinders rotation of the diverter. In certain embodiments, orifices 132 are distributed on diverter 128 so that thrust loads are minimized as the diverter begins to rotate. Orifices 132 may be sized to inhibit certain objects (e.g., pigs) to pass through the orifices and between passage 124 and passage 126 while allowing fluid to flow between the passages.

Diverter 128 may be moved (e.g., rotated) using a drive mechanism. The drive mechanism may include drive hub 134. Drive hub 134 may be located inside body 102 and coupled to, and/or contained by, flange 110. In certain embodiments, drive hub 134 includes teeth 136 that engage with teeth 138 on diverter 128. Teeth 136 may be formed as part of drive hub 134 or attached to drive hub 134 as a separate component (e.g., a ring gear that is attached to the drive hub by, for example, bolting, welding, or other attachment means). In some embodiments, teeth 136 and/or teeth 138 are castellations. When drive hub 134 is operated, teeth 136 engage with teeth 138 to move (e.g., rotate) diverter 128 between the open and closed positions. In certain embodiments, diverter 128 continuously rotates in one direction (e.g., either a clockwise or counterclockwise direction) to move between the open and closed positions. For example, diverter 128 may rotate 180° clockwise to move from the open to the closed position. Rotating diverter 128 another 180° clockwise moves the diverter from the closed position back to the open position. In some embodiments, diverter 128 is rotated in either direction to move between the open and closed positions (e.g., the diverter is rotated clockwise to open the diverter and counterclockwise to close the diverter). In certain embodiments, one or more physical "hard" stops or limits are included in fitting 100. The stops may be included to ensure that diverter 128 resides in a preferred position when it reaches the stops. For example, fitting 100 may include stops at the fully-open position and at the fully-closed position.

Figure 5:
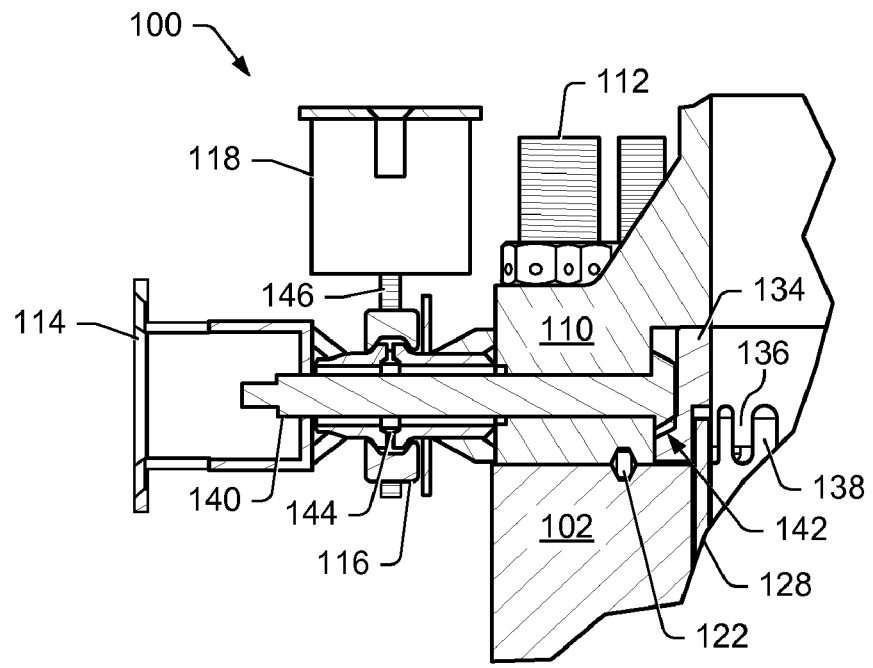
FIG. 5 depicts a cross-sectional representation of a portion of the fitting depicted in FIGS. 1 and 2 with the bucket installed.
Figure 6:
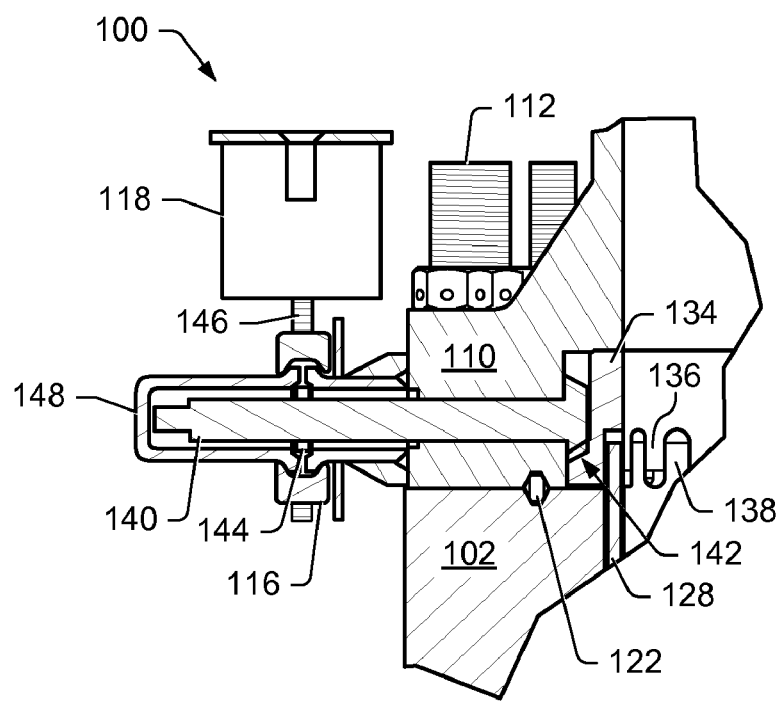
FIG. 6 depicts a cross-sectional representation of a portion of the fitting depicted in FIGS. 1 and 2 with the bucket removed and a blind hub installed on the operating mechanism.

In certain embodiments, drive hub 134 is coupled to a drive operator or gear that controls the operation (e.g., the rotation and orientation) of diverter 128. FIGS. 5 and 6 depict cross-sectional representations of fitting 100 substantially along line B-B shown in FIG. 2. FIG. 5 depicts gear 140 coupled to drive hub 134. In certain embodiments, gear 140 is a pinion gear. In certain embodiments, gear 140 includes a gear and a shaft coupled to the gear.

Figure 7:
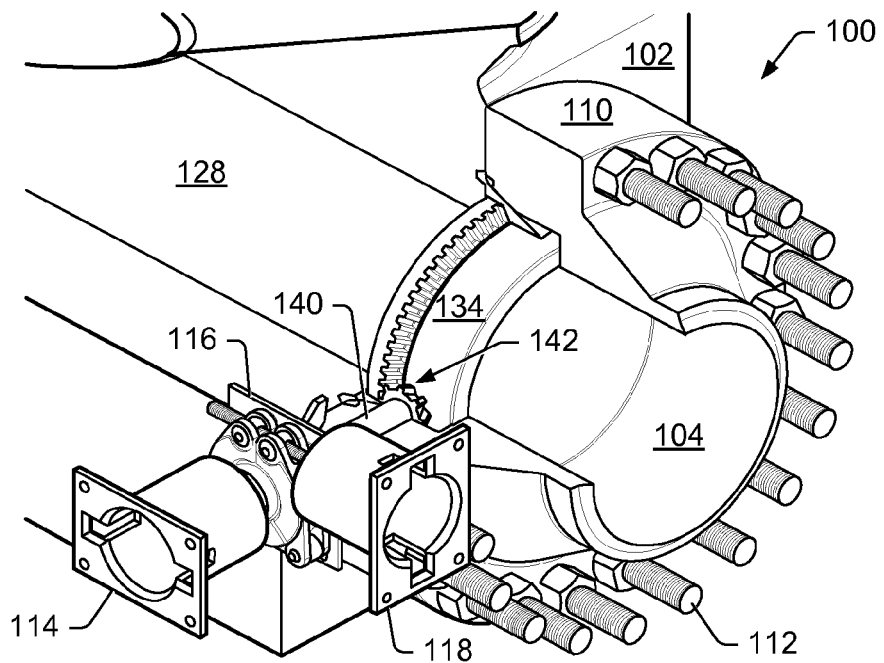
FIG. 7 depicts a perspective view of the subsea fitting with a portion of the fitting sectioned to show the teeth on a gear engaging the teeth on a drive hub.

Teeth on gear 140 may engage with teeth on drive hub 134 at point 142. In some embodiments, teeth on gear 140 and/or teeth on drive hub 134 are castellations. FIG. 7 depicts a perspective view of fitting 100 with a portion of the fitting sectioned to show the teeth on gear 140 engaging the teeth on drive hub 134. In certain embodiments, the teeth of drive hub 134 are an integral element of the drive hub. In some embodiments, the teeth of drive hub 134 are a separate component, such as a ring gear, which may be attached to the drive mechanism by, for example, bolting, welding, or other attachment means. In certain embodiments, the teeth on gear 140 and the teeth on drive hub 134 are beveled. The beveled teeth may efficiently couple operation of gear 140 to operation of drive hub 134, but other gear tooth profiles such as spiral and worm gears may be used. Gear 140 may be operated (e.g., rotated) to operate (e.g., rotate) drive hub 134. As described above, operation of drive hub 134 moves (e.g., rotates) diverter 128.

In certain embodiments, gear 140 is able to operate under pressure conditions (e.g., under subsea pressure conditions or pressurized fluid conditions in the fitting). For example, gear 140 may pass through one or more seals (e.g., seal 144 shown in FIGS. 5 and 6). As shown in FIGS. 5 and 6, seal 144 may be located inside connector 116. Seal 144 may be, for example, a dynamic and/or bidirectional seal such as a lip seal, o-ring, or other pressure-energized or enhanced seal. Seal 144 allows gear 140 to operate under subsea and/or pipeline pressure conditions by pressure isolating the internal operation of the gear (e.g., the coupling between the gear and drive hub 134) from the ambient environment. In certain embodiments, seal 144 allows gear 140 to operate at water depths of about 10,000 feet or more.

Figure 8:
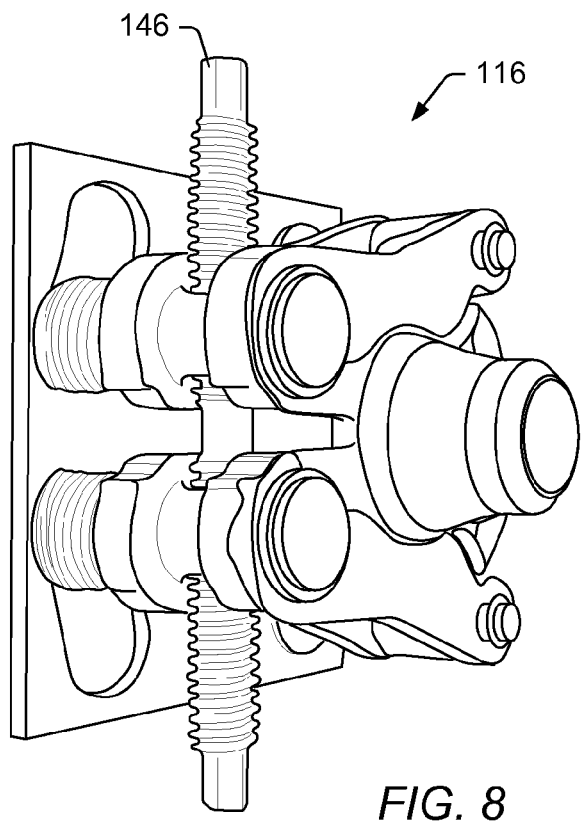
FIG. 8 depicts a perspective view of an embodiment of a connector.

FIG. 8 depicts a perspective view of an embodiment of connector 116. It is to be understood that the connector embodiment depicted in FIG. 8 is merely an example of one embodiment of a connector that may be used in fitting 100 and that there are alternative embodiments of connectors known in the art that may be used to serve the same function and/or purpose. In certain embodiments, connector 116 is a clamp type connector. The base of connector 116 may be attached (e.g., brazed or welded) to flange 110, as shown in FIGS. 5 and 6. Operation of the clamp portion of connector 116 may be controlled using connector screw 146, shown in FIGS. 5, 6, and 8. Connector screw 146 may be operated (e.g., rotated clockwise or counterclockwise) to either open or close the clamp of connector 116. In certain embodiments, connector screw 146 is operated to close the clamp and close seal 144 around the shaft of gear 140, as shown in FIGS. 5 and 6. In certain embodiments, connector screw 146 and/or gear 140 are operable using a remotely operated vehicle (an ROV).

In certain embodiments, bucket 118 is coupled to connector screw 146. Bucket 118 may be, for example, a torque bucket or other device that allows connector screw 146 to be more easily operated (e.g., the bucket allows more torque to be applied to the connector screw to rotate the screw). Bucket 118 may also act as a guide or "dock" for a robot arm (e.g., an arm of an ROV) to engage connector screw 146. For example, bucket 118 may be an industry standard torque bucket designed per API (American Petroleum Institute) 17D specifications.

In certain embodiments, bucket 114 is coupled to connector 116, as shown in FIGS. 5 and 7. Bucket 114 may be, for example, a torque bucket or other device that allows gear 140 to be operated (e.g., the bucket allows more torque to be applied to the gear to rotate the gear). Bucket 114 may also act as a guide or dock for a robot arm (e.g., an arm of an ROV) to engage gear 140. For example, bucket 114 may be an industry standard torque bucket designed per API (American Petroleum Institute) 17D specifications.

In some embodiments, connector 116 and/or connector screw 146 are operated using other types of operators. In some embodiments, the connector and/or the connector screw are operated using operators such as, but not limited to, a handle, a wheel, or a wrench-operated device. Such operators as the handle, wheel, or wrench-operated device may be operable in shallow water applications of fitting 100 where manual operation of the fitting is possible.

In some embodiments, bucket 114 is removed (e.g., uncoupled) from connector 116. For example, bucket 114 may be removed from connector 116 and replaced with blind hub 148, as shown in FIG. 6. Blind hub 148 may be coupled to connector 116 to cover the outer engagement portion of gear 140. In certain embodiments, blind hub 148 is used to provide a metal-sealed closure over gear 140 to inhibit leaks in the gear system. Providing a metal-sealed closure over gear 140 increases long-term reliability of fitting 100 against leaks by providing a metal backup seal against leaks due to deterioration of any internal seal leaks such as elastomeric or polymeric seals. In some embodiments, blind hub 148 is used to inhibit activation of gear 140 and/or inhibit damage to the gear. For example, blind hub 148 may be used to protect gear 140 from being accidentally hit and damaged.

In certain embodiments, fitting 100 includes two diverters. For example, one diverter may be located in each of the passages inside fitting 100. FIG. 9 depicts a cross-sectional representation of an embodiment of fitting 100 with two diverters 128A and 128B. In the embodiment depicted in FIG. 9, fitting 100 is a symmetrical fitting (e.g., passages 124 and 126 are symmetrical about a central axis). However, two diverters may be used in fittings that are not symmetrical (e.g., fitting 100 depicted in FIGS. 1-4).

In the embodiment depicted in FIG. 9, diverter 128A is located in passage 124 and diverter 128B is located in passage 126. Each of the diverters has its own associated flange and operating mechanisms. For example, diverter 128A is coupled to flange 110A and drive hub 134A while diverter 128B is coupled to flange 110B and drive hub 134B. Flange 110A may be coupled to body 102 using bolts 112A and seal 122A. Flange 110B may be coupled to body 102 using bolts 112B and seal 122B.

Diverters 128A and 128B include openings 130A and 130B, respectively. Openings 130A and 130B may be shaped to substantially match the shape of the junction between passages 124 and 126 when diverters 128A and 128B are in the open positions. Diverters 128A and 128B may also include orifices 132A and 132B, respectively. FIG. 9 depicts an embodiment of fitting 100 with diverter 128A in the open position (opening 130A is open to passage 126) and diverter 128B in the closed position (opening 130B is closed off to passage 124). In such an embodiment, passage 126 is open to flow and may be cleaned (e.g., passage 126 is open for pigging). In an alternative embodiment, diverter 128A is in the closed position and diverter 128B is in the open position so that passage 124 is open to flow and may be pigged in the reverse flow direction.

Figure 10:
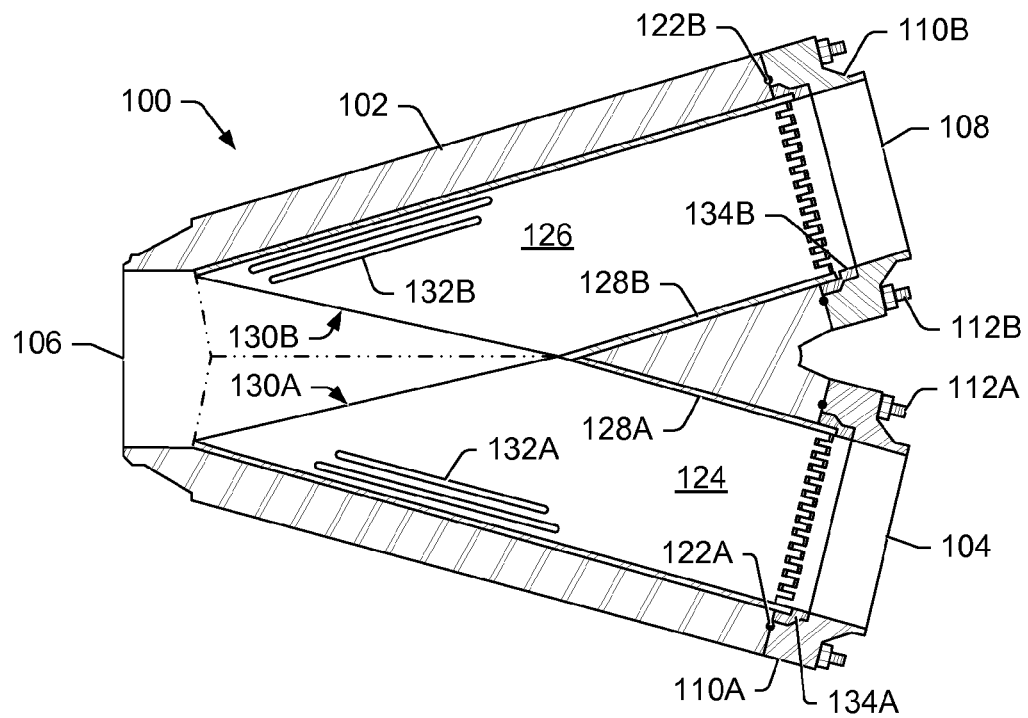
FIG. 10 depicts a cross-sectional representation of an embodiment of a subsea fitting with two diverters with both diverters in the open position.

FIG. 10 depicts a cross-sectional representation of an embodiment of fitting 100 with two diverters 128A and 128B with both diverters in the open position. In such an embodiment, passages 124 and 126 are both open for flow simultaneously. In addition, one or both of the passages may be pigged in the combining flow direction when both diverters are in the open position. In some embodiments, one of diverters 128A and 128B may be closed to direct objects larger than the diverter orifices through the fitting in a specific passage.

It is to be understood the invention is not limited to particular systems described which may, of course, vary. It is also to be understood that the terminology used herein is for the purpose of describing particular embodiments only, and is not intended to be limiting. As used in this specification, the singular forms "a", "an" and "the" include plural referents unless the content clearly indicates otherwise. Thus, for example, reference to "a bolt" includes a combination of two or more bolts and reference to "a fluid" includes mixtures of fluids.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A subsea pipeline fitting, comprising:
   a body;
   a first passage through the body coupled to a first port on a first side of the body;
   a second passage through the body coupled to a second port on the first side of the body;
   wherein the first passage and the second passage combine within the body and couple to a third port on a second side of the body, the second side being opposite from the first side of the body;
   a first tubular diverter located lengthwise in the first passage, wherein the first tubular diverter fits snugly inside the first passage such that fluid flows longitudinally from one end of the first passage to the other end of the first passage through the inside of the first tubular diverter, wherein the first tubular diverter rotates within the first passage during use, and wherein the first tubular diverter comprises a first opening in a portion of its wall; and
   a second tubular diverter located lengthwise in the second passage, wherein the second tubular diverter fits snugly inside the second passage such that fluid flows longitudinally from one end of the second passage to the other end of the second passage through the inside of the second tubular diverter, wherein the second tubular diverter rotates within the second passage during use, and wherein the second tubular diverter comprises a second opening in a portion of its wall.

2. The fitting of claim 1, wherein the tubular diverters are allowed to rotate in the passages during use such that, when the first opening in the wall of the first tubular diverter is at least partially aligned with the second passage and the second opening in the wall of the second tubular diverter is not aligned with the first passage, there is open flow in the fitting between the second port and the third port through the second passage.

3. The fitting of claim 2, wherein the second passage is allowed to be pigged during use when the first opening in the wall of the first tubular diverter is at least partially aligned with the second passage and the second opening in the wall of the second tubular diverter is not aligned with the first passage.

4. The fitting of claim 1, wherein the tubular diverters are allowed to rotate in the passages during use such that, when the first opening in the wall of the first tubular diverter is not aligned with the second passage and the second opening in the wall of the second tubular diverter is at least partially aligned with the first passage, there is open flow in the fitting between the first port and the third port through the first passage.

5. The fitting of claim 4, wherein the first passage is allowed to be pigged during use when the first opening in the wall of the first tubular diverter is not aligned with the second passage and the second opening in the wall of the second tubular diverter is at least partially aligned with the first passage.

6. The fitting of claim 1, wherein the tubular diverters are allowed to rotate in the passages during use such that, when the first opening in the wall of the first tubular diverter is at least partially aligned with the second passage and the second opening in the wall of the second tubular diverter is at least partially aligned with the first passage, there is open flow in the fitting between the first port and the third port through the first passage and between the second port and the third port through the second passage.

7. The fitting of claim 6, wherein both passages are allowed to be pigged during use when the first opening in the wall of the first tubular diverter is at least partially aligned with the second passage and the second opening in the wall of the second tubular diverter is at least partially aligned with the first passage.

8. The fitting of claim 1, wherein the two passages are oriented relative to each other such that at least one of the passages is piggable in the reverse direction during use.

9. The fitting of claim 1, wherein the two passages are oriented with an angle between the passages in a range from about 10° to about 90°.

10. The fitting of claim 1, wherein the two passages are oriented symmetrically about a central axis.

11. The fitting of claim 1, wherein at least one of the diverters comprises orifices configured to allow at least some fluid flow between the two passages to equalize pressure between the two passages, and wherein the orifices are configured to inhibit object flow between the two passages.

12. The fitting of claim 1, wherein at least one of the tubular diverters is rotated using a remotely operated vehicle (ROV) during use.

13. The fitting of claim 1, further comprising a drive hub coupled to at least one of the tubular diverters, wherein the drive hub is used to rotate the tubular diverter during use.

14. The fitting of claim 13, wherein the drive hub is coupled to one end of the passage in which the tubular diverter is located.

15. The fitting of claim 13, wherein the drive hub comprises teeth that engage teeth on the tubular diverter such that the drive mechanism is able to rotate the tubular diverter.

16. The fitting of claim 13, further comprising a gear coupled to the drive hub, wherein the gear moves the drive hub during use.

17. The fitting of claim 16, wherein the gear comprises teeth that engage teeth on the drive hub such that the gear moves the drive hub during use.

18. The fitting of claim 16, wherein the coupling between the gear and the drive hub is substantially sealed from external pressure.

19. The fitting of claim 16, wherein the gear is operable using an ROV.

20. The fitting of claim 1, wherein the fitting is coupled to a subsea pipeline during use.

* * * * *